(No Model.)
J. D. NAGEL.
WHEAT STEAMER.
No. 588,079. Patented Aug. 10, 1897.
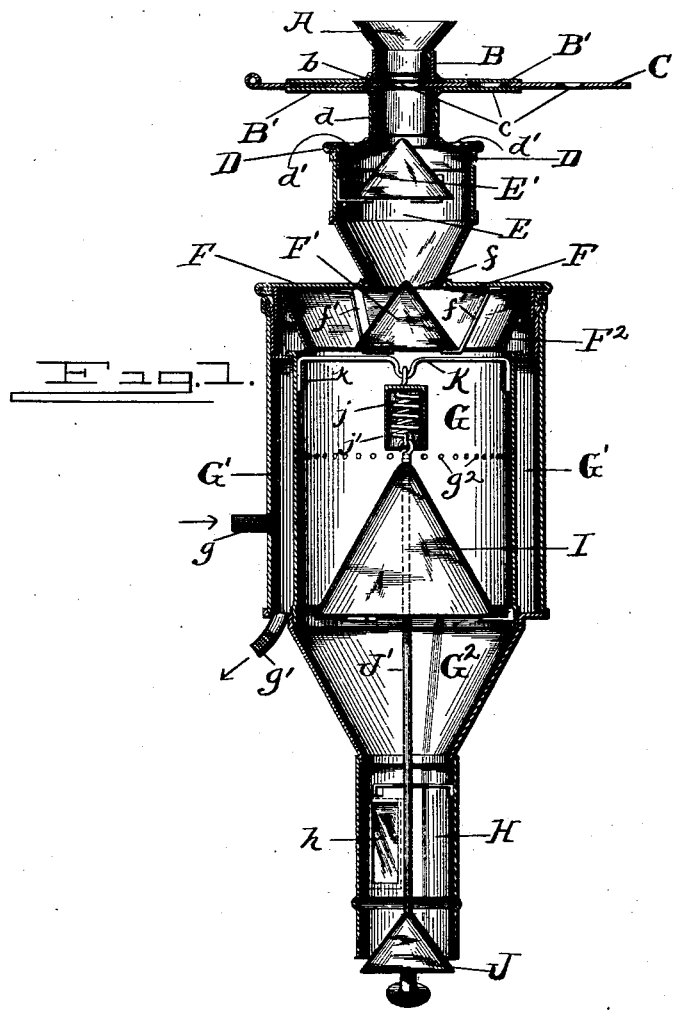
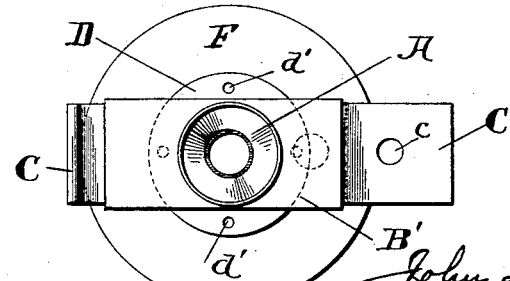
Witnesses
James R. Mansfield
Geo. M. Copenhaver
Inventor
John D. Nagel
By Alexander & Dowell
Attorneys

UNITED STATES PATENT OFFICE.

JOHN D. NAGEL, OF BUSHNELL, ILLINOIS.

WHEAT-STEAMER.

SPECIFICATION forming part of Letters Patent No. 588,079, dated August 10, 1897.

Application filed November 14, 1896. Serial No. 612,143. (No model.)

*To all whom it may concern:*

Be it known that I, JOHN D. NAGEL, of Bushnell, in the county of McDonough and State of Illinois, have invented certain new and useful Improvements in Wheat-Steamers; and I hereby declare that the following is a full, clear, and exact description thereof, reference being had to the accompanying drawings, which form part of this specification.

This invention is an improvement in wheat-steamers; and its object is to provide a steamer of such construction that the flow of grain therethrough is regulated entirely by the inlet-valve above the steaming-chamber and from which the steamed wheat will flow uniformly notwithstanding variation in the amount of steam used or in the humidity of the wheat after steaming. It is most important in roller-mills to have a uniform supply of wheat to the rolls, and this can only be satisfactorily accomplished by controlling the feed of the dry wheat to the steamer, as after it is steamed the weight and bulk of the wheat varies according to the amount and temperature of steam and length of time the wheat is subjected thereto.

The invention therefore consists in the novel and improved construction of the steamer hereinafter described and claimed, and illustrated in the accompanying drawings, in which—

Figure 1 is a vertical central section through the steamer. Fig. 2 is a detail top view of the feed-valve.

Referring to said drawings by letters of reference marked thereon, A designates the feed-hopper, detachably fitted on the upper end of a short pipe B, which has a transverse horizontal slot $b$ about its center through which passes a slide-valve C, having a series of feed-openings $c$ in it of varying diameters, either of which can be brought into register with the bore of pipe B, so as to allow wheat to pass therethrough. This slide is guided in a suitable casing B', as shown. This positive controlling of the feed by means of circular openings in the slide-valve I consider a valuable feature of the invention, as the wheat feeds more evenly and uniformly through circular openings.

The lower end of pipe B is fitted into a collar $d$, rising centrally from a cap D, closing the upper end of a small cylindrical chamber E, having a conical bottom which is fastened to the cover F of the cylindrical steaming-chamber G over a central opening $f$ in said cover.

Cap D has a series of perforations $d'$ in it for escape of any steam which might work up into chamber E from the steaming-chamber.

Within chamber E and just below the end of pipe B a conical spreader E' is suitably supported centrally in the chamber, as shown, and just below opening $f$ and within the upper end of chamber G another spreader F'' is suspended by strap-irons $f'$ or in other suitable manner from the cover F. Surrounding this spreader, but sufficiently removed therefrom to not interfere with the free flow of grain, is an annular inverted conoidal flange $F^2$, also attached to and depending from cover F, said flange being dished outwardly—*i. e.*, larger at top than at bottom—and will prevent any wheat lodging on top of the steaming-chamber G.

The walls of the steaming-chamber proper are double, forming between them an annular steam-chamber G', into which steam is admitted through a pipe from any suitable source, while the water of condensation is withdrawn through a pipe $g'$ at the bottom. Steam from chamber G' enters chamber G through a series of minute perforations $g^2$ in the inner wall thereof, as shown, so that the wheat in falling through the chamber G is subjected to the action of minute jets of steam issuing through said perforations.

The bottom $G^2$ of chamber G is conical and connects with a pipe H of larger diameter than pipe B and preferably having a sight-opening $h$ in its side, as shown. Pipe H can be fitted onto the mill or connected with the mill supply-pipe, as usual.

Within chamber G and just above the conical bottom thereof is a large spreader I, suitably supported in the chamber, so as to leave an annular passage between its bottom and the sides of chamber G for the escape of wheat. In the lower end of pipe H is fitted a conical retarder or valve J, suspended from a rod J', which extends upward through spreader I and is connected to a spring $j$ in a casing $j'$, hung from a transverse rod K, whose bent ends are retained in loops *k* on the walls of chamber G, as shown.

The spring *j* is not strong enough to close the valve against the wheat, but readily opens, more or less, so as to allow the wheat to escape from the steamer just as rapidly as it is admitted thereinto, but if less wheat is admitted the valve J will naturally not be opened so wide, and consequently steam will be less apt to descend through pipe H than if it was left entirely open at bottom.

The amount of steam used in the steamer is regulated entirely through pipe *g*. After passing into the chamber G it commingles thoroughly with the wheat, properly moistening it, and if any steam should escape into chamber E it escapes through perforations *d'* and does not pass into the pipe B, so as to interfere with the uniform flow of dry wheat through valve C.

Valve J is not designed to keep the steaming-chamber full of wheat. On the contrary, when the steamer is in use there is only a spray of wheat in it. The spring-supported valve serves to automatically keep just enough wheat in the lower tube to maintain a slight pressure of steam in the chamber. The descending wheat at the top of the steamer prevents the untoward escape of steam at the top, even in excessive steaming.

Having thus described my invention, what I therefore claim as new, and desire to secure by Letters Patent thereon, is—

1. In a wheat-steamer the combination of the steaming-chamber, having an inlet at top and outlet at bottom for the grain, a fixed spreader below the inlet-opening, an inverted conoidal flange surrounding said spreader, and a spring-upheld valve in the outlet of the steaming-chamber independent of the spreader, with a small chamber above the inlet-opening, a spreader therein, the grain-supply pipe, and a slide-valve therein above the spreaders having openings, all substantially as and for the purpose set forth.

2. In a wheat-steamer, the combination of the steaming-chamber having double walls, perforations for admitting steam into the chamber, and inlet and outlet openings at top and bottom of said steaming-chamber respectively, a pipe for supplying steam to the space between said walls, a small spreader fixed below the inlet-opening and above the steam-jet openings, a large spreader fixed below the steam-jet openings; and an inverted conoidal flange surrounding the upper spreader and above the jet-openings; with a small chamber over the inlet of the steaming-chamber having a detachable cover provided with steam-escape openings, a fixed spreader in said small chamber, a feed-pipe, a regulating slide-valve athwart said pipe, the hopper above the pipe and a spring-controlled valve hung in the outlet of the steam-chamber, so arranged that said valve is alone acted upon by the pressure of the wheat thereon, all constructed and arranged to operate substantially as and for the purpose set forth.

In testimony that I claim the foregoing as my own I affix my signature in presence of two witnesses.

JOHN D. NAGEL.

Witnesses:
JAMES J. BALL,
W. W. KIZER.